E197A XR 3,571,507

3,571,507

[72] Inventor Adrianus Korpel
Prospect Heights, Ill.

[21] Appl. No. 729,243
[22] Filed May 15, 1968
[45] Patented Mar. 16, 1971
[73] Assignee Zenith Radio Corporation
Chicago, Ill.

[54] OPTICAL APPARATUS FOR DEVELOPING DISPLAY INFORMATION SIGNALS OF FREQUENCY MULTIPLEX CHARACTER

10 Claims, 2 Drawing Figs.

[52] U.S. Cl. .......... 178/7.1
[51] Int. Cl. .......... H04n 3/10, H04n 5/30
[50] Field of Search .......... 178/65 (P), 7.3 (D), 7.5 (D), 7.1, 7.2, 7.6, 7.7; 250/199; 350/160, 161, 162

[56] References Cited

UNITED STATES PATENTS 3,055,258 9/1962 Hurvitz .......... 350/161X
3,431,504 3/1969 Adler .......... 350/161
3,462,603 8/1969 Gordon .......... 350/161X

*Primary Examiner*—Robert L. Richardson
*Attorneys*—Francis W. Crotty and Hugh H. Drake

ABSTRACT: By plural diffraction of a single beam of monochromatic light, a plurality of beams of such light, each of a different frequency, are caused to follow respectively different paths toward an image defining medium. On traversing the medium, the different beams are differently attenuated in correspondence with variations in contrast or opacity throughout the image. After traversing the medium, the beams are heterodyned with another beam upon a photodetector to produce a plurality of output signals of respective different frequencies and individually having amplitudes proportional to the respective different beam intensities. Those output signals define a video image in a manner such that the various frequency components correspond to spatial position and their respective amplitudes correspond to brightness at each position.

Figure 2:
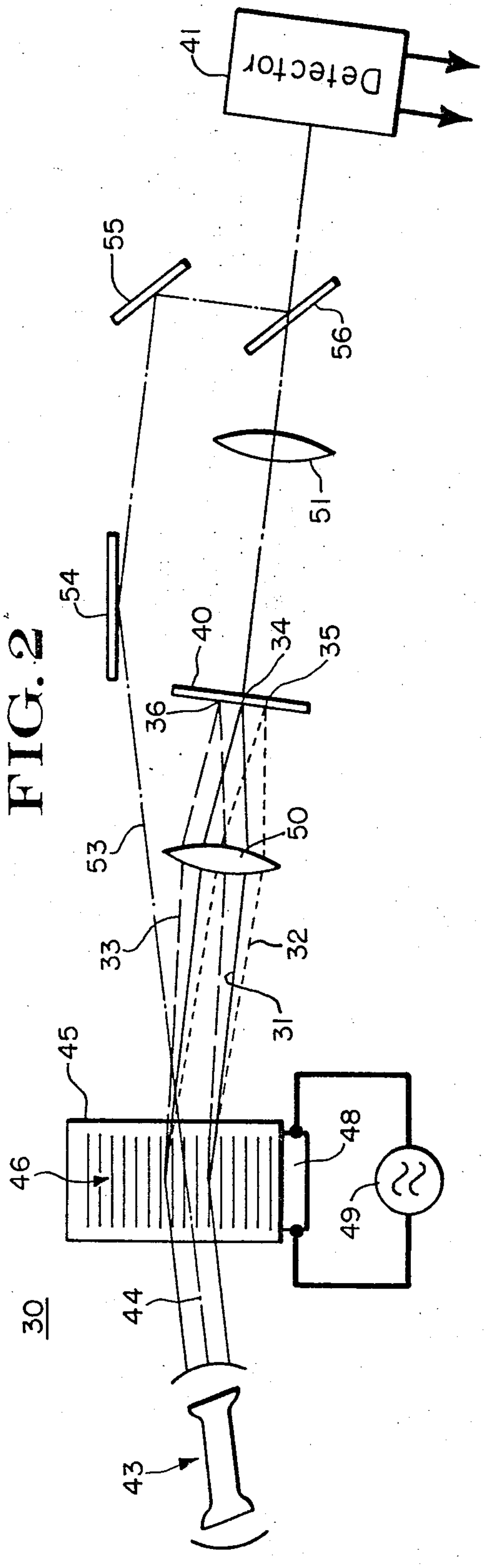

Inventor
Adrianus Korpel
By Francis W. Crotty
Attorney

OPTICAL APPARATUS FOR DEVELOPING DISPLAY INFORMATION SIGNALS OF FREQUENCY MULTIPLEX CHARACTER

The present invention pertains to optical apparatus. More particularly, it relates to display systems in which elements at selected spatial positions within an image field are represented by the frequency and amplitude of control signals.

One conventional image display system is the present-day television receiver. That receiver utilizes a cathode-ray tube in which an electron beam is based to sweep horizontally and vertically over an phosphor screen to define an image raster, while the beam intensity is modulated by a video signal to control the image brightness at each instantaneous position of the beam on the raster. Consequently, an individual picture element in the display is located by the amplitude and timing of the scanning signals, while the brightness of that picture element is determined by the instantaneous amplitude of the video signal when the electron beam is located at the position of the picture element. That is, the entire information which defines the picture element is delivered simultaneously and the energy with governs the brightness of the picture element must be delivered to the picture element in the very short time interval of the scanning trace cycle during which the electron beam is in a position on the picture element.

Numerous other devices, such as panels of electroluminescent cells, have also been proposed to produce image displays. Usually in the operation of such display systems, the incoming information is also of a time-sequential character and the kind and manner of addressing the display device correspondingly is of time-sequential type. Consequently, the entire energy for developing a picture element at any particular time determined position must be delivered during the time interval devoted to that position by the addressing apparatus. This places a heavy burden both upon the necessary characteristics of the display device and upon the requirements of the addressing apparatus.

My copending application Ser. No. 600,607, filed Dec. 9, 1966 now U.S. Pat. No. 3,488,437, issued Jan. 6, 1970, and assigned to the assignee of the present application, discloses a different display system that overcomes the aforenoted limitations of such prior systems. That system utilizes a display device which is addressed as to picture element position in terms of frequency of the addressing signals which also carry the brightness information. This contrasts with the conventional time-sequential approach described above, wherein position is governed by correlated but separate time varying scanning signals. One advantage of the display device of my prior system is that the energy utilized to develop the brightness of a given picture element may be delivered over a comparatively long period of time, instead of just during the short interval when the element is being scanned as in a time-sequential system. This is accomplished by simultaneously projecting a plurality of beams of light, spaced to define a line of image elements with the position of each beam dependent upon the frequency of a corresponding control signal and with the intensity of each beam defining the brightness of the image element it creates on an image screen. Thus, each element is, in effect, energized for the entire period which, in a time-sequential system, is devoted to the scanning of the same number of image elements, that is, to a line scan period.

In order to supply the necessary frequency-multiplex signals for driving the display device, the prior application further discloses apparatus in which a display-information signal of time-sequential character is converted to a signal of frequency-multiplex character. This, of course, renders the display system of that application compatible with conventional television standards that utilize a time-sequential mode of picture transmission. However, there is no underlying technical reason why the transmissions should not be of a frequency-multiplex character in the first place in either the case of over-the-air or closed-circuit systems. The transmission of video signals by the use of such a frequency-multiplex technique avoids the need for additional converting apparatus at the receiver, thus enhancing further the benefits to be derived from the use of display systems featuring position selection in terms of frequency of the addressing signals.

It is, accordingly, a general object of the present invention to provide new and improved apparatus for the development for the display-information signals of frequency-multiplex character.

A more specific object of the present invention is to provide apparatus which develops a display-information signal in which picture element position is represented in terms of frequency, and picture brightness at each element position is represented by the amplitude of each signal of individually different frequency.

A further object of the present invention is to provide optical apparatus of the foregoing character in which a plurality of such signals, representing a plurality of different element positions, are produced simultaneously.

Optical apparatus, in accordance with the present invention, includes means for developing a plurality of beams of monochromatic light individually directed along respective different paths and individually having respective different frequencies. Disposed in those paths are selective means for determining, respectively, the intensity of the light in the different paths. Detection means including a photodetector are disposed in those paths beyond the selective means to respond to the light for producing a plurality of output signals of respectively different frequencies and individually having an amplitude proportional to the light intensity of its particular one of the aforesaid different paths.

Figure 1:
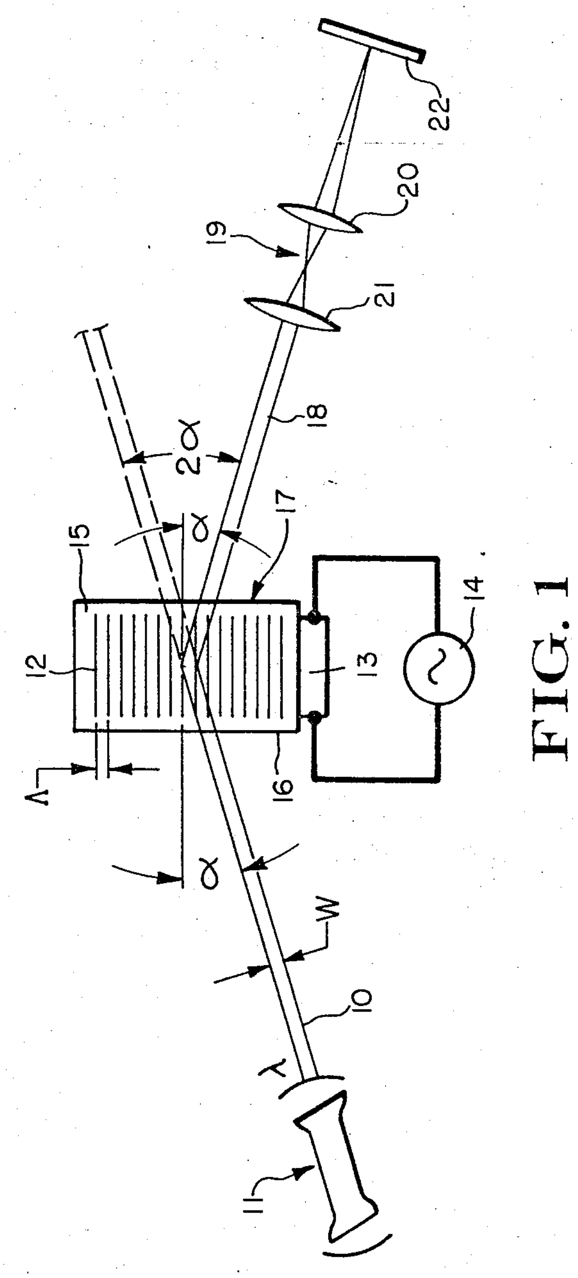

The features of the present invention which are believed to be novel are set forth with particularity in the appended claims. The invention, together with further objects and advantages thereof, may best be understood, however, by reference to the following description taken in connection with the accompanying drawings in the several FIGS. of which like reference numerals indicate like elements and in which:

FIG. 1 is a schematic diagram of an image display device suitable for use in a system in which display-information signals are of a frequency-multiplex character; and FIG. 2 is a schematic diagram of optical apparatus embodying the invention for developing display-information signals of that character.

The device of FIG. 1, depending upon the nature of signal information fed to it, may be utilized to illustrate either a time-sequential or a frequency-multiplex approach to image display. As first considered herein for convenience of explanation, it is assumed to respond to a signal of time-sequential character. As such, it depicts certain principal elements in a known image display system for which a more detailed description may be found in the copending applications of Robert Adler filed Aug. 3, 1965, Ser. Nos. 476,797 and 476,873 now U.S. Pat. No. 3,373,380, issued Mar. 12, 1968, both assigned to the same assignee as the present application. However, FIG. 1 depicts only those elements of the prior system which are utilized to cause a beam of light to interact with sound waves in a manner such that the light beam is caused to scan across an image plane. As utilized herein and in those applications, the term "light" includes optical radiation in both the visible and invisible portions of the spectrum and the term "sound" refers to acoustic-type energy of wavelengths both in the audible and superaudible ranges.

In FIG. 1, a beam 10 of light is produced by a laser 11, the light having a wavelength $\lambda$ and a width W. Propagating across the path of beam 10 are a series of sound waves 12 launched by a transducer 13 driven by a signal source 14. The sound waves, of wavelength $\Lambda$, in a typical embodiment propagate in a medium 15 such as water confined within an enclosure 16 having sidewalls transparent to the light in beam 10. The entire sound propagating assembly, here designated 17, is frequently referred to as a sound cell.

When light beam 10 is incident upon the sound wavefronts approximately at the Bragg angle $\alpha$, a portion of the light beam emerging from cell 17 is diffracted along a path 18 forming an angle with the undiffracted beam portion of $2\alpha$. Bragg angle $\alpha$ is determined in accordance with the relationship:

$\sin \alpha = \pm \lambda / 2\Lambda$. — (1) In typical applications, the actual value of angle $\alpha$ is sufficiently small that the left term in equation (1) is simply the angle $\alpha$ itself.

The diffracted light in beam 18 is projected by a telescope 19, having an eyepiece 20 and an object lens 21, upon an image screen 22. As well be evident from an examination of equation (1), the value of the diffraction angle is is function of the wavelength (or frequency) of the sound waves and, hence, is correspondingly a function of the frequency of the signals generated by source 14. As the sound wavelength decreases, the diffraction or deflection angle increases. Consequently, by scanning the sound frequency value repetitively through a range, the light beam is caused repeatedly to scan across image screen 22. Utilizing this approach and intensity modulating the light beam in accordance with the amplitude of a time-sequential video signal causes the video information to be displayed in terms of light image elements spread out across screen 22 in a line.

In accordance with conventional television practice, the light beam scansion may be synchronized with the development of the video information by a television camera. Of course, to produce an actual television display in this manner, the system also includes means for deflecting light beam 10 in a direction orthogonal to the scanning direction illustrated in FIG. 1 so that a completed image raster is defined. However, for purposes of disclosing the essential elements of the system under discussion, it is necessary to consider in detail only the manner of display with respect to one of the two orthogonal directions.

In the systems of the Adler applications, the light beam emerging on path 18 is caused to scan an image raster in the manner just described. As the beam scans each line of the raster, its image contribution is divided up onto a succession of picture elements, fully analogous to the development of picture elements in a line of a cathode-ray tube television display. The number of picture elements of the system is a function of the overall resolution of the apparatus, a greater number of picture elements in a given line resulting in correspondingly greater detail being presented by the resulting image. The brightness of each element or group of elements relative to the next is a function of the video signal information introduced into the system and results in the changes of shading across the display that together constitute the ultimate picture.

In the Adler systems, such changes in brightness from one picture element to the next are caused by intensity modulation of the light beam. To this end, a light amplitude modulator is disposed in beam path 10 between laser 11 and cell 17. In typical ones of those systems, this modulator takes the form of another sound cell in which the sound waves likewise are propagated a cross the light beam. In that case, the sound waves are produced by a signal source of constant carrier frequency with the carrier being amplitude modulated by the video information. Since the carrier frequency remains constant, the angle of diffraction of the beam by the modulation sound cell in constant but the intensity of the light emerging from the sound cell is modulated as a function of the modulation on the carrier. Consequently, as beam 18 is caused to scan screen 22 in such a system, the intensity of the light in the beam varies along the scanning line in accordance with the time-sequential variations in the amplitude of the input video signal.

Numerous modifications and refinements of the Adler approaches are described in a number of different applications assigned to the same assignee as the present application. In most of those systems, the development of each picture element occurs entirely during the very short time interval when the scanned light beam is located at the position of that picture element. In seeking to increase the time interval during which each picture element is "turned on," the system of my prior application Ser. No. 600,607 employs techniques that depart from those other systems, while at the same time utilizing and taking advantage of a number of the features of the Adler systems.

Considering the system of FIG. 1, then, from the frequency-multiplex approach, it is to be understood that it represents but one of a variety of image display mechanisms that may be incorporated into an overall system in accordance with that approach. The particular system of FIG. 1 is incorporated herein because of its simplicity and the fact that, as such, its basic mode of operation is now rather well understood in the art. A particular characteristic of the FIG. 1 apparatus, which it shares with other display mechanism utilizable with the image processing techniques disclosed hereafter, is that the position on screen 22 of the picture elements being produced at any given time is a function of the frequency of an applied signal.

For one particular angle $\alpha$ of diffraction between emerging light beam 18 and the plane of the sound wavefronts, the light beam impinges upon screen 22 at a nominal or center position as illustrated. This position corresponds to a particular frequency of the sound. At this position, the diffracted light also is of a given intensity, and hence the brilliance of the spot formed on screen 22 is likewise of a given intensity, determined by the amplitude of the sound signal and thus upon the intensity of the sound waves in cell 17 by which the light is diffracted. If, then, the frequency of the sound signal from source 14 is increased so that the sound wavelength is decreased, angle $\alpha$ is likewise increased so that the spot formed on screen 22 is moved to a position toward the lower end of screen 22 in FIG. 1. Again, the intensity of this new spot is a function of the amplitude of the sound signal of this new frequency.

When source 14 simultaneously develops two signals individually of different frequency and amplitude, cell 17 correspondingly diffracts incoming light beam 10 into two light beams at respective angles $\alpha_1$ and $\alpha_2$ which in turn develop corresponding spots spaced along screen 22 in the direction of the scanning line. The two spots individually have respective intensities corresponding to the respective amplitudes of the two signals supplied by source 14. Up to a maximum limit determined by the resolution N of the system, the number of signals simultaneously developed by source 14 may be increased to any number as a result of which cell 17 diffracts a corresponding plurality of beams to produce a like plurality of spots distributed across screen 22. Each of the spots has a position on screen 22 and an intensity or a brightness corresponding to the frequency and amplitude, respectively, of a particular one of the signal components produced by source 14.

Thus, the display system of my prior application utilizes a plurality of signals from source 14 that differ in frequency and individually are representative of position and amplitude of a corresponding plurality of video picture elements. These signals launch respective sound waves simultaneously across a light beam in order to cause diffraction of the light. The corresponding plurality of diffracted beams simultaneously produce an entire image line of picture elements, or at least a significant portion of an entire line of picture elements. A generally similar system oriented to move the light beams in the orthogonal direction may be employed to effect scanning of a complete image raster. However, by virtue of the comparatively slow vertical scanning speed in present-day television systems, the system of FIG. 1 has been used for the higher rate horizontal deflection and a simple galvanometer-controlled mirror has been employed to accomplish the vertical deflection.

To enable this display system to be utilized directly with conventional time-sequential television signals, my prior application also describes apparatus for converting those signals into frequency-multiplex character. In the development of present-day video signals, an image is scanned one horizontal line at a time and a signal of constant frequency is caused to vary in amplitude throughout the line scanning time interval in accordance with the changes in image brightness across the scanned line during that interval. That is, the camera, or the video amplifier in a television receiver that redevelops the camera signal, constitutes a source of signals the amplitude of which changes in time. The converting apparatus described in my prior application responds to those time-sequential signals and yields control signals which, when applied to transducer 13 in FIG. 1, enable the development on screen 22 of image elements at positions predetermined by respective control-signal frequencies and each of an intensity determined by the respective amplitude of its control signal. That is, the converting apparatus develops a plurality of control signals the individual frequencies of which differ to represent corresponding different image points or picture elements. As also described in my prior application, the control signals preferably are stored as they are developed and then those representing an entire scanning line, or a substantial portion thereof, are simultaneously delivered to the image display system for a substantial period of time, such as a line scan period of the time-sequential system.

My prior application further described in detail numerous other considerations attendant to both the optical and electrical operation of the FIG. 1 system. While it may be desirable to refer to that application for a more comprehensive understanding of the operation of the display device itself with respect to the enhancement of such features as resolution, peak brightness and the relationship between such parameters as sound velocity, light beam width, transit time of the sound across the light beam and the proportion of a total image line that is simultaneously developed, it will suffice for present purposes to note but a few of the more salient considerations. In order to frequency-address the display device with respect to picture element position, source 14 develops a plurality of signals of amplitude $E_n$ each assigned a frequency $f_o + n\delta f$, where $n$ represents a series of integers assigned to the respective different control signal frequencies, $E$ represents the amplitude of the signal at each frequency, $f_o$ is the basic carrier frequency of source 14 without deviation to produce the different control signal frequencies and $\delta f$ is the frequency difference between the different control signals corresponding to the separation between resolvable spots or resolvable picture elements of the resultant image. That is, the composite control signal produced by source 14 may be thought of as being composed of a plurality of carriers with individual amplitudes for each of the points of an image line, or at least of a portion thereof. Thus, each point on the image line is addressed by a frequency characteristic of its location. The $n$th point is addressed by the signal $f_o + n\delta f$. Preferably, the entire image line is displayed simultaneously for a time $T_L$, the length of a scanning line. The scanning in the orthogonal direction may be comparatively slow, and the control of that function may be obtained, in general, by changing the value of the fundamental carrier frequency $f_o$ by a coarser amount, greater than the maximum $n\delta f$, in appropriate steps corresponding to the succession of lines.

Whatever particular type of display device is utilized for responding to this type of signal information, it is apparent that the quantity $\delta f$ must be such that the display can discriminate between neighboring points. Since the device as preferably operated has the time $T_L$ in which to do this:

$\delta f \gtrsim 1/T_L = 1/N\Delta$ — (2) where $\Delta T$ is equal to the quantity $T_L/N$ and corresponds to the number of control signals, and the number of resolvable points $N$ corresponds to the highest modulation frequency present in a time-sequential frame of reference. The total frequency span $\delta F$ represented by the plurality of control signals is given by the relationship:

$\Delta F = N\delta f \gtrsim N/T_L = 1/\Delta T$ — (3) It may be noted that the required bandwidth for handling the plurality of control signals is the same as that of present-day time-sequential television systems. Moreover, an advantage of the frequency-addressed display approach is that the delivery of the picture element information may be spread out over the total line trace interval $T_L$ rather than just over the time $\Delta T$. This means that the peak brightness of the display can be reduced by the resolution factor $N$ Of course, this is extremely important in a case where there is a limitation on peak brightness such as in electroluminescent display devices or in apparatus in which the human eye response may become saturated. In any case, a given picture element developed by the frequency-addressing system may be caused to persist for a time-interval much longer than that corresponding to the "on-time" of a picture element in a time-sequential system where that element is developed only as a beam sweeps past the position of the element.

The overall function of the system of FIG. 2 is to serve as a source of image-defining signals of frequency-multiplex character and thus function, for example, as source 14 in FIG. 1 to provide both the video information and the scanning signals for the frequency-addressed image display. That is, the system of FIG. 2 produces a plurality of output signals of respectively different frequencies and individually having amplitudes proportional to the respective different brightness values at correspondingly different locations across an image. To this end, the FIG. 2 system first includes a source 30 of a plurality of beams 31 —33 of monochromatic light individually directed along respective different paths and individually having respective different frequencies. Beyond plural beam source 30 is an image defining selective element 40 that determines the intensity of the light in the respective different ones of the plural beams in correspondence with differences in brightness at different positions over the image. Finally, in terms of major components, a photodetector 41 is disposed in the paths of the plural beams beyond selective element 40 and responds to the light in those beams to develop a plurality of output signals. Those signals have respective different frequencies and individually have amplitudes proportional to the respective different intensities in the different light paths so as to be proportional to the different values of brightness at the corresponding different positions throughout the image.

In more detail, the plural beam source includes a laser 43 that develops a monochromatic or single-frequency beam 44 of coherent light. Beam 44 preferably is wider, though well collimated, than that typically obtained from a laser. Accordingly, a telescope, or lens combination or similar optical component may be included just beyond laser 43 to broaden the beam width (in the direction of deflection) while maintaining a high degree of collimation. That beam is directed into a sound cell 45 in which a plurality of sound wave trains 46 of different acoustic frequencies are caused to propagate across beam 44. While a plurality of such acoustic wave trains simultaneously exist within cell 45, each one acts upon beam 44 to deflect or diffract a portion of the light in beam 44 into a unique path, determined as indicated by equation (1) by its particular acoustic frequency. Accordingly, a plurality of light beams emerge from cell 45, each directed along its unique path, that is to say, the angle of diffraction in each case is determined by one acoustic frequency. For convenience of illustration only three such beams are shown in FIG. 2; beam 31 defined in full-line construction, beam 32 enclosed within short-dash construction lines and beam 33 outlined by long-dash construction lines. It will be assumed that these paths are angularly separated in the direction of a horizontal line, on correspondence with the difference in wavelengths of the different acoustic waves simultaneously present within cell 45. All of the acoustic waves are concurrently launched by a wide-band transducer 48 driven by a sound source 49. In order to attain the development of a plurality of sound wave trains of respective different frequencies within cell 45, source 49 produces a similar plurality of different frequency acoustic signals, preferably all of equal and constant amplitude so as to avoid the necessity elsewhere in the systems of compensating for differences of amplitude between them.

As specifically embodied herein, source 49 is a noise generator of any conventional variety that produces over a broad band so-called white noise. As is well-known, white noise within a specified frequency band may be considered as a continuous distribution of frequencies over a given finite bandwidth. This may be through of as an infinite number of channels of infinitesimal width, each such channel containing a signal of center frequency $f$ and infinitesimal bandwidth. However, it is well-known in the art that such white noise may be conveniently analyzed instead as a finite plurality of channels, each of a finite bandwidth $\Delta f$ and containing a bandwidth-limited random noise signal centered at some frequency $f$. Furthermore, it is well-known that if the bandwidth $\Delta f$ of such a channel is very small compared to $f$, the narrow-band noise signal thus defined represented will look very much like a continuous wave (C.W.) signal of the frequency $f$ when observed, for example, on an oscilloscope or spectrum analyzer, the only difference being that the amplitude and phase of the narrow-band noise signal fluctuate at a slow rate, that rate having an upper limit of $\Delta f$. The amplitude fluctuations cause corresponding fluctuations of power which tend to average out when post-detection bandwidth is substantially less than $\Delta f$.

A single broad-band white-noise signal may be resolved into a finite plurality of narrow-band signals. Now when a broad-band white-noise signal is used to drive an ultrasonic cell according to the invention, the incident monochromatic coherent light beam is diffracted over a distribution of paths of differing angular orientation corresponding to the distribution of sound frequencies contained within the noise signal, with light frequencies a function of angular orientation in accordance with the Bragg formula. This should not be surprising since, as was previously mentioned the noise signal diffracting the incident light may be described as a plurality of narrow-band acoustic signals, each characterized by a definite center frequency $f$. Consequently, the acoustic wave trains that exist in cell 45, representing a broad spectrum of acoustic frequencies, may each be associated with one of the plurality of narrow-band noise signals, since each such narrow-band signal $f$ behaves as a C.W. signal of the same frequency would to cause light to be diffracted in accordance with the Bragg formula. This frequency spectrum or band of course will include all of the frequencies $f_o + n\delta f$ discussed above that correspond to the succession of resolvable image elements along a line across the width of the selective element 40.

There results a continuous band or distribution of diffracted light, which may be interpreted and described (as in the case of the sound) as a corresponding plurality of narrow-band light channels or beams, each having a definite center frequency and unique angular orientation. That is, each of the different acoustic wave trains diffracts a portion of beam 44 into a different one of a plurality of beam portions, with the difference in the spatial positions of those beams being directly proportional to the difference in the acoustic wavelengths in accordance with equation (1), the Bragg formula. If the conditions encountered in a specific case permit the time-averaging of the random fluctuations in each light channel, the random noise channels may be replaced by C.W. channels or beams of equal power.

In any optical device, directions or rays and positions of focal points can be described only with an accuracy limited by the well-known diffraction limits. In a Bragg diffraction cell, which separates diffracted light beams in accordance with acoustic frequency, there exists a resolution limit for acoustic frequencies which is directly related to the conventional diffraction limit. In dividing the diffracted light into a number of channels differing in direction and frequency, it is possible to choose as the channel width $\Delta f$ that width which just separates the center frequencies of adjacent diffraction limited rays. This is the maximum number of nonoverlapping beams possible with the particular cell. One can also choose a smaller $\Delta f$ for the analysis, but in that case the beams overlap. All such choices are equally valid.

As noted, beam 44 is wide and well collimated. While collimation is desirable in any event, a high degree of resolution is obtained by using the wide-beam 44 and then focusing the plurality of overlapping diffracted beams onto element 40. To this end, a lens system is disposed between cell 45 and element 40 so as to focus all of the light in each one of the plurality of beams, each corresponding to a particular acoustic signal, into respective diffraction limited image points on element 40. As shown, and continuing the simplification described above, a convergent lens 50 is disposed to intercept beam portions 31—33 and focus them at image points 34—36, respectively, in the plane defined by element 40. A telescope, similar to telescope 14 of FIG. 1 or other equivalent optical system, may be employed in this region so as to magnify the angles of diffraction of light portions 31—33.

To alter differently the intensity of the light in respective ones of beams 31—33 selective element 40 may be in the form of any of a number of known mechanism. That is, it may either attenuate or enhance the intensity of the different beams impinging upon it. For example, it may be part of an image amplifiers but, as illustrated for convenience of explanation, element 40 is simply a transparency on which an image is defined by different degrees of opacity to the oncoming light beams. That is, the darker regions of the image attenuate by a comparatively large amount the beam or beams transmitted through the transparency at the locations or positions of such darker regions. Consequently, the light beams emerging through element 40 at respectively different positions are individually different in intensity and correspondence with the brightness of the image element at each respective different position. State another way, each one of the different light beams transversing selective element 40 is coded in terms of amplitude in correspondence with the brightness of the image at the position or location in the image through which that beam passes. Because beams 31—33 are focused upon element 40, the light in those beams may emerge from that element as highly divergent quantities that overlap completely between element 40 and detector 41. Nevertheless, those quantities are considered, in this specification and in the claims, as beams for clarity of definition. As will be seen, such divergence and overlap need be of no consequence for the reason that element 40 is imaged onto detector 41.

At the same time, each of the different light beam portions 31—33, upon being diffracted in cell 45, is also shifted in frequency by an amount that is equal to the frequency of the acoustic waves that effected its diffraction. This frequency shift process is a direct result of the light-sound interaction. While all of the light in original beam 44 is of a single frequency, the diffracted portions are of unique and different frequencies. For example, assuming the light in beam 32 to have been diffracted by an acoustic signal of 40 megahertz, that light is shifted in frequency by that same 40 megahertz amount away from the frequency of the light in beam 44; in this case, the direction of that shift is downward because the acoustic wavefronts in cell 45 are advancing away from the light in incoming beam 44. At the same time, the light in beam 33, having been diffracted at a lesser angle representing a lower sound frequency, is shifted downward in frequency by an amount, for example, of but 20 megahertz. Beams 32 and 33 therefore, differ in frequency from each other by 20 megahertz. Beams 32 and 33 therefore, differ in frequency from each other by 20 megahertz. In this way, each different position in a line across the width of selective element 40 is represented by a beam of light of a specific unique frequency. Consequently, each beam emerging from element 40 is coded with a frequency that represents the spatial position of the beam at the same time that it is coded with an amplitude that represents the shading, contrast or brightness of the image at that unique position.

Detector 41 is responsive to the light in all the beams and is disposed across all their paths. While detector 41 may be disposed immediately following selective element 40, flexibility in the arrangement of the components preferably is afforded by inserting a convergent lens 51, or equivalent optical system, intermediate element 40 and detector 41 in order to image the plural beams emerging from the selective element onto the active surface of the detector. Utilizing a convergent lens 51 having a given focal length, element 40 and detector 41 are disposed to lie in the conjugate image planes of the lens.

Theoretically, detector 41 may respond directly to the incoming light of beams 31—33 to convert the light into electrical energy. However, lacking suitable truly light frequency AC detectors, detection and the development of the output signals is obtained by heterodyning the plurality of beams transversing element 40 with another quantity of light of the same frequency as that in beam 44. In one such arrangement as illustrated, the portion of the light in beam 44 that is undiffracted, and therefore unchanged in frequency by interaction with acoustic waves 46, is directed to detector 41 and impinges upon the latter simultaneously with the plurality of beams passing through element 40. To this end, the undiffracted original beam portion 53 is guided by reflectors 54 and 55 to a partially reflective mirror 56. Mirror 56, in turn, guides that undiffracted light onto detector 41 while at the same time permitting passage to the detector of a substantial portion of the light in the plurality of beams transversing element 40. Preferably, mirror 56 is oriented to guide the undiffracted light from path 53 toward detector 41 so that it is in spatial coincidence with the light in the plurality of beams emerging from element 40; in this way, heterodyning of the different light frequencies occurs over the entire active surface of the detector that is simultaneously exposed to all of the different light beams.

Where it is inconvenient to use the undiffracted light in path 53 for heterodyning purposes, as in the case where, by reason of the small diffraction angles involved, lens 50 would interfere with the light in path 53, the heterodyning or local-oscillator light quantity may be derived otherwise. For example, it may be taken from path 44 prior to cell 45 by means of a partially reflective mirror located in path 44 to divert a portion of that light so as to be directed to detector 41 by means of an arrangement of reflectors 54, 55 and partial mirror 56. As another alternative, many typical lasers emit coherent light from opposite ends of the constituent laser cavity so that light beam 44 would represent the light from one such end; in that case, the light from the so-called back beam emerging from the other end of the laser may be directed by a system of mirrors to serve at detector 41 as the heterodyning light quantity. As a still further alternative, the heterodyning light quantity may be obtained from a separate source such as another laser preferably slaved in terms of frequency and phase to laser 43.

As indicated above, beam 44 desirably is expanded in width as a result of which each of the plurality of the diffracted beams likewise are individually of a broadened width. Moreover, the positions of the beams at points 34—36 are distributed across an area of element 40 of substantial width. Preferably, the plural beams emerging from cell 45 span a line width of the image or element 40 and are sufficient in number to provide the desired resolution. Consequently, it is contemplated that the heterodyning light quantity, such as that in path 53, be broadened so as to impinge upon the active surface of detector 41 simultaneously over the entire region of that surface responsive to the different ones of the plurality of beams emerging from element 40. That is, the local-oscillator light is caused to flood the entire area of detector 41 throughout which the plurality of beams emerging through element 40 are distributed.

To review the operation of the FIG. 2 apparatus, source 49 launches in cell 45 a plurality of acoustic wave trains each a different acoustic wavelength and hence representing a signal of a different frequency. As specifically described above, source 49 is a carrier modulated with noise so as to develop an assortment of signals spread throughout a range from 19 to 40 megahertz. Incoming light beam 44 is diffracted by the different acoustic waves into a corresponding plurality of beams each of unique frequency and each having a unique spatial position. This plurality of beams in this case is spread out in a line across the surface of selective element 40. The different beams are variously attenuated in accordance with the image content across element 40 so as to exhibit a distribution of intensity corresponding to the contrast distribution across the image. The plurality of beams emerging from the selective element are imaged onto detector 41 where they are heterodyned or mixed with the reference light quantity of fixed frequency arriving along path 53. Consequently, detector 41 develops a plurality of electrical output signals of individually different frequencies and of particular amplitudes. Indeed, the heterodyning process develops as an output of detector 41 a plurality of components corresponding in frequency to the components developed in source 49; the frequency of each such component signifies a particular location in the image defined in selective element 40 and the amplitude of that component is proportional to the content of the image at that specific location.

Thus, the output signals from detector 41 may be considered as constituting the output of source 14 in FIG. 1, and when so utilized as the source of signals in FIG. 1 they cause that apparatus to display upon screen 22 a replica or reproduction of the image that is defined by selective element in 40 of FIG. 2. The apparatus in FIG. 2, therefore, constitutes a source of video signals of frequency-multiplex character, signals which advantageously may be used in any frequency-addressed kind of image display. Since source 49 in FIG. 2 provides signals of all of the plurality of frequencies simultaneously and continuously, an entire image likewise is developed simultaneously and continuously for any desired period of time. This permits the frequency-addressed display system, such as the one of FIG. 1, to develop an image of enhanced brightness since each picture element in a given line may persist for the entire time period assigned to the development of that line. This is a distinct advantage when the display device for any reason, has a peak power imitation.

Analogous to the case of FIG. 1, the FIG. 2 system may readily be arranged so that the image in selective element 40 is also analyzed in direction orthogonal to the direction of spread of beams 31—33. In perhaps the simplest case to visualize, this is accomplished simply by physically moving selective element 40 in that orthogonal direction at the appropriate vertical scanning rate in respect of the overall system. That is, when the direction in spread of beams 31—33 represents the normal horizontal scanning direction, element 40 is moved vertically at the corresponding vertical scanning rate. That movement may either be in steps corresponding to the vertical separation of the horizontal scanning lines or it may be continuous in which case those lines are caused gradually to blend together. Alternatively, a rotating mirror may be disposed in common in the paths of the beams to slowly move those beams vertically across the surface of element 40; analogous movement may be imparted in the vertical direction to beam 44 to effect similar vertical scanning of the beams. As still another alternative, such vertical scanning may be accomplished by use of an additional light-sound interaction cell disposed to cause beam 44, or the plurality of beams guided to selective element 40, to be diffracted in the vertical direction. As a still different alternative, the plurality of beams impinging upon selective element 40 my be wide in the vertical scanning direction and the projection system represented by lens 51 modified so as to image upon detector 41 only a narrow horizontal stripe of the light emerging from selective element 40, with the selected area defining that stripe being caused to move vertically.

While considerably more complex, and still considering the direction in spread of beams 31—33 to represent the direction of a horizontal image line, the system in FIG. 2 may be further modified in a fully analogous manner to diffract the incoming light in beam 44 also simultaneously into a plurality of paths spread apart in the vertical direction. The light in each of those vertically separated paths is then further diffracted by cell 45 into a plurality of paths spread out in the horizontal direction. Hence, a whole bundle of light paths are distributed throughout both the vertical and horizontal dimensions of selective element 40 and the light in each path has a unique frequency that represents the position in both the horizontal and vertical directions. Correspondingly, the signals developed by detector 41 each have a unique frequency that defines position on the image in selective element 40 in both the horizontal and vertical directions while at the same time having an amplitude proportional to image content at that location.

From the foregoing, it will be apparent that a number of different particular arrangements are possible for carrying out the underlying principles disclosed. In all cases, however, at least one group of signals are developed which represent by their different frequencies the position of elements in an image and by their amplitudes the picture content of each element. Consequently, the overall signal that is developed may be utilized directly as the control signal for operating any of a number of different kinds of frequency-addressed display systems.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Optical apparatus comprising: means for developing a plurality of beam individually of monochromatic light, individually directed along respective different paths and individually having respective different frequencies;

selective means disposed in said paths for determining, respectively, the intensity of the light in said different paths;

and detection means, including a photodetector disposed in said paths beyond said selective means, responsive to said light for producing a plurality of output signals of respectively different frequencies and individually having an amplitude proportional to the light intensity of its particular one of said different paths.

2. Apparatus as defined in claim 1 in which said plurality of beams are developed simultaneously.

3. Apparatus as defined in claim 1 in which said different paths are positionally related to define a line at said selective means.

4. Apparatus as defined in claim 1 in which said developing means includes a source of a beam of single-frequency light together with means for diffracting said single-frequency beam to form said plurality of beams of said different frequencies.

5. Apparatus as defined in claim 4 which further includes means for simultaneously directing to said photodetector another beam of light having a frequency the same as that of said single-frequency beam.

6. Apparatus as defined in claim 4 in which said diffracting means comprises:

a source of input signals of a plurality of diverse frequencies;

and means for propagating across said single-frequency beam, in diffractive interaction therewith a plurality of acoustic wave trains developed individually in response to different ones of said input signals.

7. Apparatus as defined in claim 6 in which a lens is disposed between said developing means and said selective means for focusing said plurality of beams from the region of said diffractive interaction onto said selective means.

8. Apparatus as defined in claim 1 in which said selective means is a medium in which an image is defined by means of a plurality of regions having individually different opacity for effecting, respectively, different alterations of the intensity of said light and in which said plurality of beams individually are focused upon respective different ones of said regions.

9. Apparatus as defined in claim 8 which further includes means for imaging said medium upon said photodetector.

10. Apparatus as defined in claim 9 in which said beams are focused upon an image line of said medium and including means for effectively scanning said beams in a direction normal to said image line.